(12) United States Patent
Tseng et al.

(10) Patent No.: US 10,514,782 B2
(45) Date of Patent: Dec. 24, 2019

(54) ACTIVE STYLUS SIGNAL IDENTIFICATION METHOD APPLIED TO CAPACITIVE TOUCH PANEL

(71) Applicant: Raydium Semiconductor Corporation, Hsinchu (TW)

(72) Inventors: Kuo-Tsung Tseng, Zhubei (TW); Pei-Jiong Chen, New Taipei (TW); I-Ling Chiu, New Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 15/952,526

(22) Filed: Apr. 13, 2018

(65) Prior Publication Data

US 2018/0299978 A1 Oct. 18, 2018

Related U.S. Application Data

(60) Provisional application No. 62/485,044, filed on Apr. 13, 2017.

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01); *G06F 2203/04106* (2013.01)

(58) Field of Classification Search
CPC ..... G06F 3/044; G06F 3/0416; G06F 3/03545
USPC .................................................. 345/173, 174
See application file for complete search history.

(56) References Cited

U.S. PATENT DOCUMENTS

| | | | |
|---|---|---|---|
| 2012/0327040 A1* | 12/2012 | Simon | G06F 3/03545 345/179 |
| 2016/0048234 A1* | 2/2016 | Chandran | G06F 3/044 345/174 |
| 2017/0308186 A1* | 10/2017 | Yamamoto | G06F 3/041 |

* cited by examiner

*Primary Examiner* — Calvin C Ma

(57) ABSTRACT

An active stylus signal identification method applied to a capacitive touch panel is disclosed. When an active stylus and a finger approach the capacitive touch panel at the same time, the active stylus signal identification method includes steps of: (a) during a first period, the active stylus emits an active stylus signal toward the capacitive touch panel according to a protocol; (b) during a second period after the first period, the active stylus stops emitting the active stylus signal and a touch sensing circuit performs a finger touch sensing on the capacitive touch panel; (c) during a third period after the second period, the active stylus emits the active stylus signal toward the capacitive touch panel again according to the protocol.

11 Claims, 3 Drawing Sheets

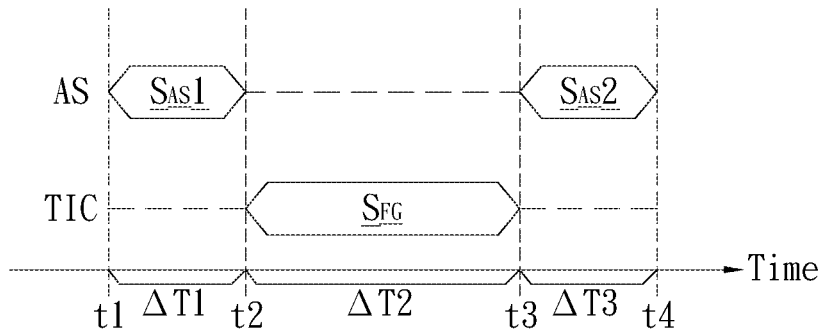

FIG. 3

```
                    START
                      │
                      ▼                                    ┌─S20
  during a first period, active stylus emits a first active
   stylus signal toward capacitive touch panel according to a
                  protocol of active stylus
                      │
                      ▼                                    ┌─S22
  during a second period after the first period, active stylus
   stops emitting first active stylus signal and touch sensing
    circuit performs a first finger touch sensing on a part of
              display area of capacitive touch panel
                      │
                      ▼                                    ┌─S24
  during a third period after the second period, active stylus
    emits a second active stylus signal toward capacitive touch
           panel according to the protocol of active stylus
                      │
                      ▼                                    ┌─S26
  during a fourth period after the third period, active stylus
   stops emitting second active stylus signal and touch sensing
    circuit performs a second finger touch sensing on another
              part of display area of capacitive touch panel
                      │
                      ▼                                    ┌─S28
  during a fifth period after the fourth period, active stylus
    emits a third active stylus signal toward capacitive touch
           panel according to the protocol of active stylus
                      │
                      ▼
                     END
```

FIG. 4

ACTIVE STYLUS SIGNAL IDENTIFICATION METHOD APPLIED TO CAPACITIVE TOUCH PANEL

BACKGROUND OF THE INVENTION

1. Field of the invention

The invention relates to an active stylus; in particular, to an active stylus signal identification method applied to a capacitive touch panel.

2. Description of the prior art

In general, the active stylus can be used with touch panels for smart phones, tablet computers and notebook computers. The active stylus signal transmitted by the active stylus is sent to the touch integrated circuit through the touch panel and processed by the touch integrated circuit to obtain the precise coordinates of the active stylus on the touch panel and the button state and pressure value of the active stylus. Then, this information will be transmitted to the system to complete the function of operating system or drawing line by the active stylus.

However, since different active stylus may regulate their respective protocols, in order to achieve a higher report rate, for example, 100 Hz or more, it is necessary to transmit coordinates and button state and pressure value and so on within a limited time (e.g., 15 ms). In other words, when the active stylus approaches the touch panel, the calculation amount of the touch IC is relatively large, and the methods of sensing the active stylus and the hand are different. Therefore, a common practice is that, when the active stylus approaches the touch panel, the touch sensing circuit will stop the touch sensing of the finger. Even the finger presses the touch panel, the touch panel does not react until the active stylus moves away from the touch panel. In other words, for the conventional touch panel, it is still difficult to achieve the effect of allowing the active stylus and the finger to operate the touch panel at the same time, resulting in many applications that require the active stylus and the finger to operate simultaneously.

SUMMARY OF THE INVENTION

Therefore, the invention provides an active stylus signal identification method applied to a capacitive touch panel to overcome the above-mentioned problems in the prior art.

An embodiment of the invention is an active stylus signal identification method. In this embodiment, when an active stylus and a finger approach the capacitive touch panel at the same time, the active stylus signal identification method includes steps of: (a) during a first period, the active stylus emits a first active stylus signal toward the capacitive touch panel according to a protocol; (b) during a second period after the first period, the active stylus stops emitting the first active stylus signal and a touch sensing circuit performs a first finger touch sensing on the capacitive touch panel; (c) during a third period after the second period, the active stylus emits the second active stylus signal toward the capacitive touch panel again according to the protocol.

In an embodiment, the active stylus signal identification method includes a step of: (d) during a fourth period after the third period, the active stylus stopping emitting the second active stylus signal and the touch sensing circuit performing a second finger touch sensing on the capacitive touch panel.

In an embodiment, the active stylus signal identification method further includes a step of: (e) during a fifth period after the fourth period, the active stylus emitting a third active stylus signal toward the capacitive touch panel according to the protocol.

In an embodiment, in the step (b), when a time needed for the touch sensing circuit to scan all the display region of the capacitive touch panel is longer than the second period, then the first finger touch sensing performed by the touch sensing circuit during the second period only scan a part of the display region of the capacitive touch panel.

In an embodiment, in the step (d), the second finger touch sensing performed by the touch sensing circuit during the fourth period continuously scans another part of the display region of the capacitive touch panel which is not scanned in the step (b).

In an embodiment, when the capacitive touch panel receives the first active stylus signal, the capacitive touch panel transmits the first active stylus signal to the touch sensing circuit and the touch sensing circuit processes the first active stylus signal to generate an active stylus information.

In an embodiment, the active stylus information includes a position information, a button state and a pressure value of the active stylus on the capacitive touch panel.

In an embodiment, the active stylus signal identification method further includes steps of: (f) determining whether a time needed for the touch sensing circuit to scan all the display region of the capacitive touch panel is longer than the second period plus the fourth period; and (g) if a determining result of the step (f) is no, the touch sensing circuit generating a finger touch information corresponding to all the display region of the capacitive touch panel according to sensing results of the first finger touch sensing and the second finger touch sensing.

In an embodiment, the finger touch information includes a position information of the finger on the capacitive touch panel.

In an embodiment, the touch sensing circuit is coupled to a first touch electrode and a second touch electrode of the capacitive touch panel, during the first period and the third period, the first touch electrode and the second touch electrode are used as receiver to receive the first active stylus signal and the second active stylus signal.

In an embodiment, during the second period and the fourth period, the first touch electrode is used as transmitter and the second touch electrode is used as receiver, the touch sensing circuit transmits a touch driving signal through the first touch electrode and receives a touch sensing signal through the second touch electrode to finish the first finger touch sensing and the second finger touch sensing.

In an embodiment, the protocol defines a time for the active stylus to emit the first active stylus signal and the touch sensing circuit performs the first finger touch sensing on the capacitive touch panel according to the protocol.

Compared to the prior arts, the active stylus signal identification method of the invention can let the capacitive touch panel be operated by the active stylus and the finger at the same time and can also effectively prevent the active stylus signal emitted by the active stylus from being interfered by the driving signal when the touch sensing circuit senses the touch of the finger through the functions of automatic detection and partition scanning of the touch sensing circuit.

The technical feature of the invention is to sense whether the finger touches the capacitive touch panel during a period of time called spare area that the active stylus does not emit active stylus signal, so that the finger and the active stylus can operate the capacitive touch panel simultaneously.

Because the touch sensing principle and method for the finger and the active stylus are different, and the spare area that the active stylus does not emit active stylus signal is usually short in the protocol of the active stylus, and the spare area may even be divided into discontinuous segments, so that the touch sensing circuit often fails to scan the entire frame at one time. Therefore, the touch sensing circuit needs to have a segmented scanning capability, so as to automatically avoid the time interval of the active stylus signal and divide the finger touch sensing action into several segments in the time zone in which the active stylus does not emit the active stylus signal. Then, the sensing results of all segments are integrated to realize the application of the active stylus and the finger to operate the capacitive touch panel at the same time.

The advantage and spirit of the invention may be understood by the following detailed descriptions together with the appended drawings.

BRIEF DESCRIPTION OF THE APPENDED DRAWINGS

FIG. 3 illustrates a timing diagram of the active stylus signal identification method corresponding to FIG. 2.

FIG. 4 illustrates a flowchart of the active stylus signal identification method in another embodiment of the invention.

DETAILED DESCRIPTION OF THE INVENTION

Figure 1:
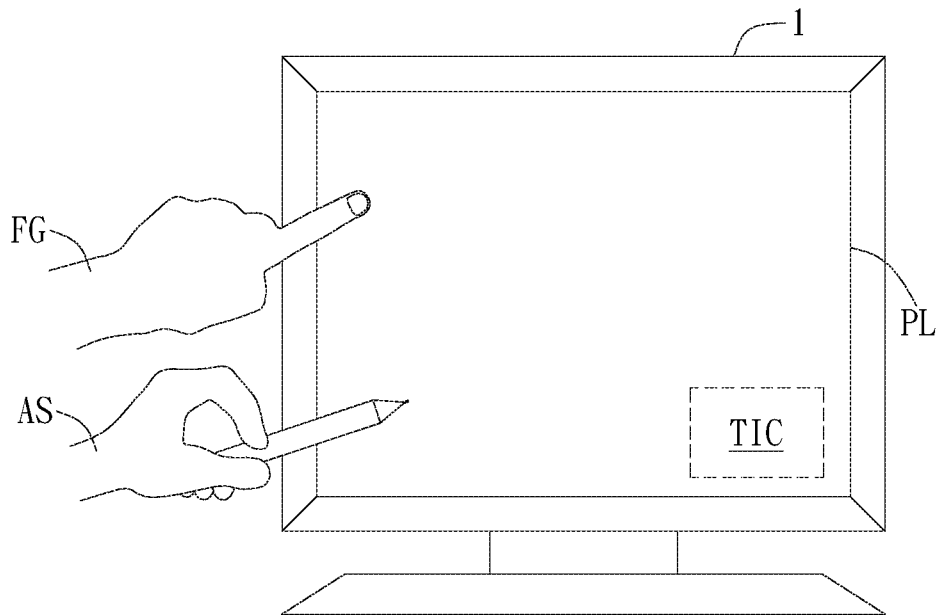
FIG. 1 illustrates a schematic diagram of the finger and the active stylus touching the capacitive touch panel at the same time.

A preferred embodiment of the invention is an active stylus signal identification method. In this embodiment, as shown in FIG. 1, the active stylus signal identification method uses a touch sensing circuit TIC having the segmented scanning capability to perform finger touch sensing action avoiding the time zone that the active stylus AS emits the active stylus signal, and then the sensing results of the segments are integrated to achieve the effect that the finger FG and the active stylus AS can touch and operate the capacitive touch panel PL at the same time. Therefore, the problem that the touch sensing circuit stops finger touch sensing when the active stylus approaches the touch panel in prior art can be solved.

It should be noted that the active stylus signal identification method of the invention can be used in the out-cell capacitive touch panel and the on-cell capacitive touch panel having larger noise, but not limited to this.

Figure 2:
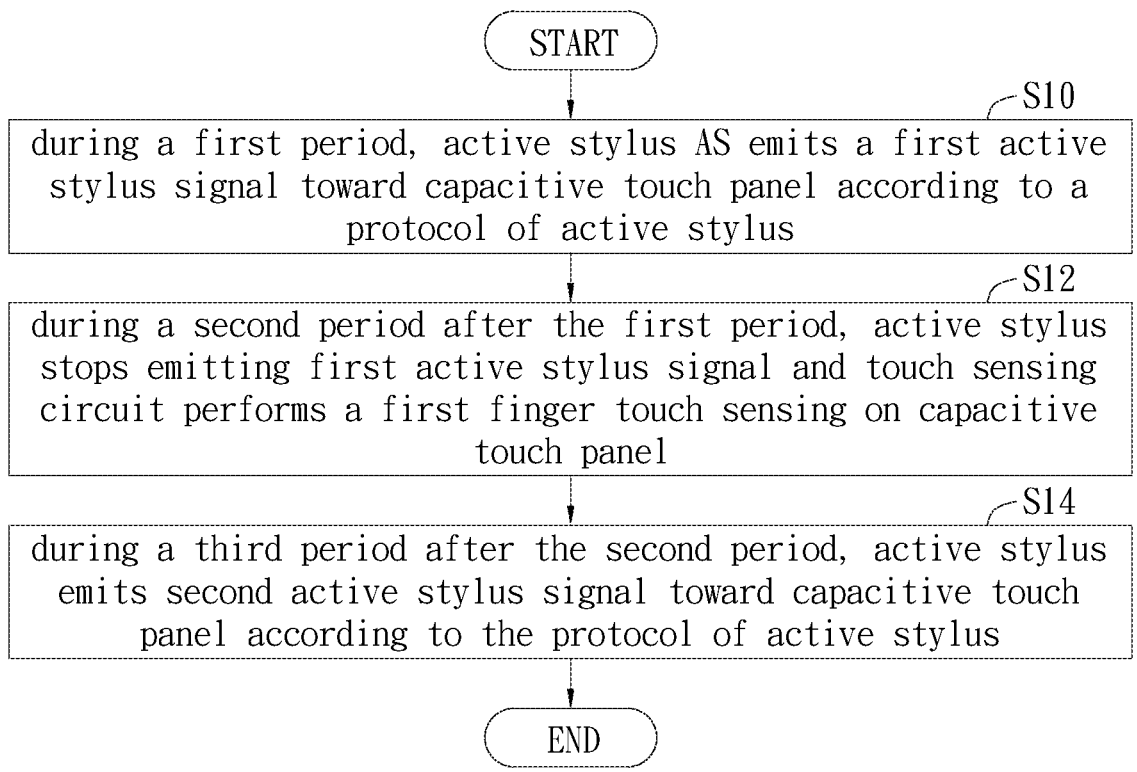
FIG. 2 illustrates a flowchart of the active stylus signal identification method in an embodiment of the invention.

Please refer to FIG. 2 and FIG. 3. FIG. 2 illustrates a flowchart of the active stylus signal identification method in an embodiment of the invention; FIG. 3 illustrates a timing diagram of the active stylus signal identification method corresponding to FIG. 2. From FIG. 1~FIG. 3, it can be found that when the active stylus AS and the finger FG approach the capacitive touch panel PL at the same time, the active stylus signal identification method can include following steps.

Step S10: during a first period ΔT1, the active stylus AS will emit a first active stylus signal $S_{AS}1$ toward the capacitive touch panel PL according to a protocol of the active stylus AS;

Step S12: during a second period ΔT2 after the first period ΔT1, the active stylus AS will stop emitting the first active stylus signal $S_{AS}1$ and the touch sensing circuit TIC will perform a first finger touch sensing $S_{FG}$ on the capacitive touch panel PL;

Step S14: during a third period ΔT3 after the second period ΔT2, the active stylus AS will emit the second active stylus signal $S_{AS}2$ toward the capacitive touch panel PL according to the protocol of the active stylus AS.

In this embodiment, if the time needed for the touch sensing circuit TIC to scan the entire display area of the capacitive touch panel PL is shorter than or equal to the second period ΔT2, the first finger touch sensing $S_{FG}$ performed by the touch sensing circuit TIC during a second period ΔT2 has completed the scanning of the entire display area of the capacitive touch panel PL. In other words, the touch sensing circuit TIC in this embodiment can use the second period ΔT2 that the active stylus AS does not emit any active stylus signal to scan one entire frame displayed on the capacitive touch panel PL instead of dividing into multiple scans.

In practical applications, when the capacitive touch panel PL receives the first active stylus signal $S_{AS}1$ or the second active stylus signal $S_{AS}2$ emitted by the active stylus As, the capacitive touch panel PL will transmit the first active stylus signal $S_{AS}1$ or the second active stylus signal $S_{As}2$ to the touch sensing circuit TIC and the touch sensing circuit TIC will process the first active stylus signal $S_{AS}1$ or the second active stylus signal $S_{AS}2$ to generate an active stylus information, for example, a position information, a button state and a pressure value of the active stylus AS on the capacitive touch panel PL, but not limited to this. And, the touch sensing circuit TIC can obtain the finger touch information, for example, the touch position information of the finger FG on the capacitive touch panel PL, according to the sensing result of the first finger touch sensing $S_{FG}$ performed on the capacitive touch panel PL by the touch sensing circuit TIC, but not limited to this.

In an embodiment, the touch sensing circuit TIC is coupled to a first touch electrode (e.g., a transmitter electrode TX) and a second touch electrode (e.g., a receiver electrode RX) of the capacitive touch panel PL. During the first period ΔT1 and the third period ΔT3, the first touch electrode and the second touch electrode are used as receiver to receive the first active stylus signal $S_{AS}1$ and the second active stylus signal $S_{AS}2$; during the second period ΔT2, the first touch electrode is used as transmitter and the second touch electrode is used as receiver, the touch sensing circuit TIC can transmit a touch driving signal through the first touch electrode and receive a touch sensing signal through the second touch electrode to finish the first finger touch sensing $S_{FG}$ performed on the capacitive touch panel PL.

In practical applications, the protocol of the active stylus AS can define the time that the active stylus AS emits the first active stylus signal $S_{AS}1$ and the second active stylus signal $S_{AS}2$, and the touch sensing circuit TIC can also include a timing controller to control the time of performing the finger touch sensing $S_{FG}$ on the capacitive touch panel PL avoiding the time that the active stylus AS emits the first active stylus signal $S_{AS}1$ and the second active stylus signal $S_{AS}2$ defined by the protocol of the active stylus AS.

Figure 5:
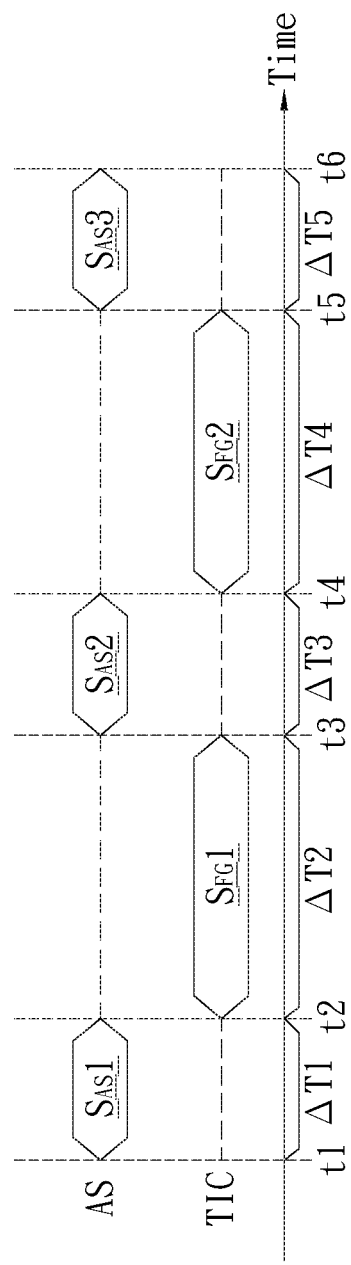
FIG. 5 illustrates a timing diagram of the active stylus signal identification method corresponding to FIG. 4.

In another embodiment, if the first finger touch sensing $S_{FG}$ performed by the touch sensing circuit TIC during a second period ΔT2 fails to complete the scanning of the entire display area of the capacitive touch panel PL, as shown in FIG. 4 and FIG. 5, the active stylus signal identification method can include the following steps.

Step S20: during a first period ΔT1, the active stylus AS will emit a first active stylus signal $S_{AS}1$ toward the capacitive touch panel PL according to a protocol of the active stylus AS;

Step S22: during a second period ΔT2 after the first period ΔT1, the active stylus AS will stop emitting the first active stylus signal $S_{AS}1$ and the touch sensing circuit TIC will perform a first finger touch sensing $S_{FG}1$ on a part of display area of the capacitive touch panel PL;

Step S24: during a third period ΔT3 after the second period ΔT2, the active stylus AS will emit a second active stylus signal $S_{AS}2$ toward the capacitive touch panel PL according to the protocol of the active stylus AS;

Step S26: during a fourth period A T4 after the third period A T3, the active stylus AS will stop emitting the second active stylus signal $S_{AS}2$ and the touch sensing circuit TIC will perform a second finger touch sensing $S_{FG}2$ on another part of display area of the capacitive touch panel PL;

Step S28: during a fifth period ΔT5 after the fourth period ΔT4, the active stylus AS will emit a third active stylus signal $S_{AS}3$ toward the capacitive touch panel PL according to the protocol of the active stylus AS.

In practical applications, after the step S26 is finished, the active stylus signal identification method will determine whether a time needed for the touch sensing circuit TIC to scan all the display region of the capacitive touch panel PL is longer than the second period ΔT2 plus the fourth period ΔT4.

If the above-mentioned determining result is no, it means that the entire display region of the capacitive touch panel PL has been scanned during the second period ΔT2 and the fourth period ΔT4. And then, the touch sensing circuit TIC can generate the finger touch information corresponding to all the display region of the capacitive touch panel PL according to the sensing results of the first finger touch sensing $S_{FG}1$ and the second finger touch sensing $S_{FG}2$.

Otherwise, if the above-mentioned determining result is yes, after the step S28 is performed, when the active stylus AS stops emitting the third active stylus signal $S_{AS}3$ toward the capacitive touch panel PL according to the protocol of the active stylus AS, the touch sensing circuit TIC can further perform a third finger touch sensing on the unscanned display area of the capacitive touch panel PL. Afterward, the touch sensing circuit TIC can generate the finger touch information corresponding to all the display region of the capacitive touch panel PL according to the sensing results of the first finger touch sensing $S_{FG}1$, the second finger touch sensing $S_{FG}2$ and the third finger touch sensing.

Compared to the prior arts, the active stylus signal identification method of the invention can let the capacitive touch panel be operated by the active stylus and the finger at the same time and can also effectively prevent the active stylus signal emitted by the active stylus from being interfered by the driving signal when the touch sensing circuit senses the touch of the finger through the functions of automatic detection and partition scanning of the touch sensing circuit.

The technical feature of the invention is to sense whether the finger touches the capacitive touch panel during a period of time called spare area that the active stylus does not emit active stylus signal, so that the finger and the active stylus can operate the capacitive touch panel simultaneously. Because the touch sensing principle and method for the finger and the active stylus are different, and the spare area that the active stylus does not emit active stylus signal is usually short in the protocol of the active stylus, and the spare area may even be divided into discontinuous segments, so that the touch sensing circuit often fails to scan the entire frame at one time. Therefore, the touch sensing circuit needs to have a segmented scanning capability, so as to automatically avoid the time interval of the active stylus signal and divide the finger touch sensing action into several segments in the time zone in which the active stylus does not emit the active stylus signal. Then, the sensing results of all segments are integrated to realize the application of the active stylus and the finger to operate the capacitive touch panel at the same time.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An active stylus signal identification method applied to a capacitive touch panel, when an active stylus and a finger approach the capacitive touch panel at the same time, the active stylus signal identification method comprising steps of:
    (a) during a first period, the active stylus emitting a first active stylus signal toward the capacitive touch panel according to a protocol;
    (b) during a second period after the first period, the active stylus stopping emitting the first active stylus signal and a touch sensing circuit performing a first finger touch sensing on the capacitive touch panel; and
    (c) during a third period after the second period, the active stylus emitting a second active stylus signal toward the capacitive touch panel according to the protocol;
    wherein in the step (b), when a time needed for the touch sensing circuit to scan all the display region of the capacitive touch panel is longer than the second period, then the first finger touch sensing performed by the touch sensing circuit during the second period only scan a part of the display region of the capacitive touch panel.

2. The active stylus signal identification method of claim 1, further comprising a step of:
    (d) during a fourth period after the third period, the active stylus stopping emitting the second active stylus signal and the touch sensing circuit performing a second finger touch sensing on the capacitive touch panel.

3. The active stylus signal identification method of claim 2, further comprising a step of:
    (e) during a fifth period after the fourth period, the active stylus emitting a third active stylus signal toward the capacitive touch panel according to the protocol.

4. The active stylus signal identification method of claim 1, wherein in the step (d), the second finger touch sensing performed by the touch sensing circuit during the fourth period continuously scans another part of the display region of the capacitive touch panel which is not scanned in the step (b).

5. The active stylus signal identification method of claim 1, wherein when the capacitive touch panel receives the first active stylus signal, the capacitive touch panel transmits the first active stylus signal to the touch sensing circuit and the touch sensing circuit processes the first active stylus signal to generate an active stylus information.

6. The active stylus signal identification method of claim 5, wherein the active stylus information comprises a position information, a button state and a pressure value of the active stylus on the capacitive touch panel.

7. The active stylus signal identification method of claim 1, wherein the touch sensing circuit is coupled to a first touch electrode and a second touch electrode of the capacitive touch panel, during the first period and the third period, the first touch electrode and the second touch electrode are used as receiver to receive the first active stylus signal and the second active stylus signal.

8. The active stylus signal identification method of claim 7, wherein during the second period and the fourth period, the first touch electrode is used as transmitter and the second touch electrode is used as receiver, the touch sensing circuit transmits a touch driving signal through the first touch electrode and receives a touch sensing signal through the second touch electrode to finish the first finger touch sensing and the second finger touch sensing.

9. The active stylus signal identification method of claim 1, wherein the protocol defines a time for the active stylus to emit the first active stylus signal and the touch sensing circuit performs the first finger touch sensing on the capacitive touch panel according to the protocol.

10. An active stylus signal identification method applied to a capacitive touch panel, when an active stylus and a finger approach the capacitive touch panel at the same time, the active stylus signal identification method comprising steps of:

(a) during a first period, the active stylus emitting a first active stylus signal toward the capacitive touch panel according to a protocol;

(b) during a second period after the first period, the active stylus stopping emitting the first active stylus signal and a touch sensing circuit performing a first finger touch sensing on the capacitive touch panel;

(c) during a third period after the second period, the active stylus emitting a second active stylus signal toward the capacitive touch panel according to the protocol;

(d) determining whether a time needed for the touch sensing circuit to scan all the display region of the capacitive touch panel is longer than the second period plus the fourth period; and (e) if a determining result of the step (d) is no, the touch sensing circuit generating a finger touch information corresponding to all the display region of the capacitive touch panel according to sensing results of the first finger touch sensing and the second finger touch sensing.

11. The active stylus signal identification method of claim 10, wherein the finger touch information comprises a position information of the finger on the capacitive touch panel.

* * * * *